(12) United States Patent
Behre et al.

(10) Patent No.: US 8,747,011 B2
(45) Date of Patent: Jun. 10, 2014

(54) BALL AND SOCKET JOINT, AS WELL AS PROCESS FOR MANUFACTURING A BALL AND SOCKET JOINT

(75) Inventors: Matthias Behre, Holdorf (DE); Christian Maassmann, Merzen (DE); Jens Bach, Lembruch (DE); Dirk Adamczyk, Lemförde (DE); Reinhard Stöterau, Saint-Just/ Saint-Rambert (FR); Jean-Paul Castanet, Monistrol sur Loire (FR); Marc Rochigneux, Saint Genest Lerpt (FR)

(73) Assignee: ZF Friedrichshafen AG, Friedrichshagen (DE)

(*) Notice: Subject to any disclaimer, the term of this patent is extended or adjusted under 35 U.S.C. 154(b) by 1324 days.

(21) Appl. No.: 12/161,051

(22) PCT Filed: Jan. 15, 2007

(86) PCT No.: PCT/DE2007/000077
§ 371 (c)(1),
(2), (4) Date: Jul. 16, 2008

(87) PCT Pub. No.: WO2007/082509
PCT Pub. Date: Jul. 26, 2007

(65) Prior Publication Data
US 2010/0158603 A1    Jun. 24, 2010

(30) Foreign Application Priority Data
Jan. 17, 2006   (DE) .................. 10 2006 002 395

(51) Int. Cl.
*F16C 11/06*    (2006.01)

(52) U.S. Cl.
USPC .......................................... 403/135

(58) Field of Classification Search
USPC .............. 403/122, 133–135, 50, 51
See application file for complete search history.

(56) References Cited

U.S. PATENT DOCUMENTS

| | | | | |
|---|---|---|---|---|
| 2,733,085 A | * | 1/1956 | Latzen | 403/128 |
| 4,256,413 A | * | 3/1981 | Abe | 403/282 |
| 4,564,307 A | * | 1/1986 | Ito | 403/140 |
| 4,568,216 A | * | 2/1986 | Mizusawa et al. | 403/143 |
| 4,690,581 A | * | 9/1987 | Umemoto et al. | 403/133 |
| 4,904,107 A | * | 2/1990 | Fukukawa et al. | 403/122 |
| 5,044,811 A | * | 9/1991 | Suzuki et al. | 403/134 |
| 5,489,161 A | * | 2/1996 | Sugita et al. | 403/134 |
| 5,611,635 A | * | 3/1997 | Schutt et al. | 403/141 |

(Continued)

FOREIGN PATENT DOCUMENTS

DE    101 63 147 A1    7/2003

*Primary Examiner* — Joshua Kennedy
(74) *Attorney, Agent, or Firm* — McGlew and Tuttle, P.C.

(57) ABSTRACT

A ball and socket joint, for example, for an axle system of a motor vehicle, as well as to a process for manufacturing a joint housing for a ball and socket joint. The ball and socket joint has an essentially annular joint housing (3), in the cylindrical interior space of which a ball shell (1) can be arranged. The ball (2) of a ball pivot can be accommodated in the ball shell (1) in a slidingly movable manner. The joint housing is of a smooth cylindrical design in the area of a housing cover-side functional section (14), while elevations (10) and/or depressions (15) are arranged in the area of a ball pivot-side functional section (13) of the inner jacket surface of the joint housing.

18 Claims, 2 Drawing Sheets

(56) References Cited

U.S. PATENT DOCUMENTS

| | | | |
|---|---|---|---|
| 5,704,727 A * | 1/1998 | Atkins et al. | 403/135 |
| 5,743,669 A * | 4/1998 | Fujita et al. | 403/131 |
| 5,772,337 A * | 6/1998 | Maughan et al. | 384/206 |
| 5,876,149 A * | 3/1999 | Dorr et al. | 403/134 |
| 5,885,022 A * | 3/1999 | Maughan et al. | 403/135 |
| 6,109,816 A * | 8/2000 | Iwasaki | 403/135 |
| 6,190,080 B1 * | 2/2001 | Lee | 403/135 |
| 6,505,989 B1 * | 1/2003 | Pazdirek et al. | 403/135 |
| 6,821,047 B2 * | 11/2004 | Broker | 403/132 |
| 7,004,665 B2 * | 2/2006 | Wasylewski et al. | 403/135 |
| 7,080,539 B2 * | 7/2006 | Parker | 72/358 |
| 2003/0049071 A1 * | 3/2003 | Ohmura et al. | 403/122 |
| 2004/0105722 A1 * | 6/2004 | Gercke et al. | 403/135 |
| 2005/0063769 A1 | 3/2005 | Holmes | |
| 2006/0140711 A1 * | 6/2006 | Morales Arnaez | 403/122 |
| 2006/0193681 A1 * | 8/2006 | Holierhoek et al. | 403/122 |
| 2008/0138150 A1 * | 6/2008 | Budde et al. | 403/135 |

\* cited by examiner

BALL AND SOCKET JOINT, AS WELL AS PROCESS FOR MANUFACTURING A BALL AND SOCKET JOINT

CROSS REFERENCE TO RELATED APPLICATIONS

This application is a United States National Phase application of International Application PCT/DE2007/000077 and claims the benefit of priority under 35 U.S.C. §119 of German Patent Application DE 10 2006 002 395.1 filed Jan. 17, 2006, the entire contents of which are incorporated herein by reference.

FIELD OF THE INVENTION

The present invention pertains to a ball and socket joint, for example, for an axle system, for a wheel suspension or for a rocker pendulum on a motor vehicle. The present invention pertains, furthermore, to a process for manufacturing a joint housing for a ball and socket joint.

BACKGROUND OF THE INVENTION

The requirements imposed on ball and socket joints of this class include especially high specific loadability and low bearing clearance under both static and dynamic loads as well as low break-away and operating torque, as well as a low maintenance requirement or absence of need for maintenance over the service life of the motor vehicle or ball and socket joint, the lowest possible weight and a low space requirement for installation. In addition, manufacture shall be as cost-effective as possible.

Such a ball and socket joint is known, for example, from DE 101 63 147 A1. This ball and socket joint has a hollow cylindrical joint housing, in the interior space of which a ball shell made of plastic is inserted for receiving the joint ball arranged on a ball pivot in a slidingly movable manner. The ball shell of the ball and socket joint disclosed in the document is supported in the axial direction of the joint housing by means of two circumferential collars on the front sides of the joint housing.

The first of the two circumferential collars is already from the outset made integrally in one piece with the plastic ball shell in this prior-art ball and socket joint, while the second collar of the ball shell located opposite the first collar is manufactured in the prior-art ball and socket joint for geometric reasons only after the ball shell has been introduced into the joint housing of the ball and socket joint.

In other words, the ball shell is introduced—together with the ball pivot already arranged therein—into the housing during the assembly of the prior-art ball and socket joint such that the first collar is supported on a first, mostly ball pivot-side front surface of the housing. The second collar arranged on the opposite side of the housing in relation to the first collar is then prepared from the previously still projecting ring collar of the ball shell by means of a shaping process. The document being cited suggests thermal shaping or ultrasound shaping for shaping the ring collar into the collar.

However, it was found that such a design of the anchoring of the plastic ball shell in the joint housing does not always meet the increasing requirements imposed on loadability, failure safety and weather resistance in ball and socket joints of this class. In particular, loosening of the ball shell in the joint housing may develop over the service life of the ball and socket joint. Undesired relative motions may thus develop between the joint housing and the ball shell, which may lead to wear especially of the ball shell in the area of the outer circumference thereof as a consequence of the friction associated therewith as well as as a consequence of the entry of dirt between the ball shell and the joint housing, as a result of which the ball and socket joint may eventually fail prematurely.

To solve this problem, it is proposed in the document DE 101 63 147 A1 to arrange elevations and/or depressions, for example, inner corners, edges or furrows in the area of the inner jacket surface of the joint housing over the entire height of the housing. The ball shell, which has a certain oversize compared to the joint housing, and which has, without any change, an essentially cylindrical outer jacket surface, is then introduced or pressed into the interior space of the joint housing during the assembly of the ball and socket joint. The outer jacket surface of the ball shell is plastically deformed during this pressing-in operation corresponding to the relief or shaping of the inner jacket surface of the joint housing to a certain extent, as a result of which improved, positive-locking connection is obtained between the joint housing and the ball shell.

However, it was found that corrosion continued to develop between the outer jacket surface of the ball shell and the inner jacket surface of the joint housing in joint housings of such a design with elevations and depressions arranged on the inner jacket surface for positive-locking connection with the ball shell. As the applicant has determined, this is due especially to the fact that water or dirt continued to be able to enter between the ball shell and the joint housing precisely because of the elevations and depressions that were continuous over the entire height of the joint housing.

The collars of the ball shell, which are arranged on the front side at both ends of the joint housing, are also unable to completely prevent this. This is linked, on the one hand, with the fact that a sufficient axial prestress of the ball shell in the joint housing cannot always be guaranteed after the shaping of the projecting ring collar of the ball shell into the collar. On the other hand, these leaks between the ball shell and the joint housing are linked, as the applicant found out, especially with the fact that due to the elevations and depressions arranged in the joint housing over the entire height thereof, the contact surface available for the corresponding collar of the ball shell often lacks a sufficiently large size and smoothness.

The quality of the beading of the ring collar of the ball shell into the collar, which is frequently carried out by means of ultrasound, is also potentially compromised because of the depressions and elevations on the inner jacket surface of the joint housing, which are continuous up to the two front sides of the joint housing, which may likewise compromise the anchoring of the ball shell in the joint housing as well as the tightness of the gap between the joint housing and the ball shell.

Another disadvantageous effect of the continuous elevations and depressions arranged on the inner jacket surface of the joint housing, which occurs in the ball and socket joints known from the state of the art, is that these elevations and depressions are prepared in the state of the art only later, for example, by means of embossing or broaching, on the joint housing manufactured in advance.

Elevations of varying heights and depressions of varying depths frequently develop along the circumference of the joint housing on the inner jacket surface of the joint housing during this subsequent preparation of the elevations and depressions either because of inaccuracies and tolerances of the subsequent operation or because of differences in the accumulation of material, which occur already during the manufacture of the blank for the joint housing. Such different elevations or depressions and run-outs of the joint housing may then lead to an irregular or increased prestress between the ball shell and the joint ball of the ball and socket joint.

This also leads again, besides the binding of the ball and socket joint associated therewith, to increased wear of the joint and hence to a reduction of the service life of the ball and socket joint or entails the risk of premature failure of the ball and socket joint, which cannot be accepted, especially in case of safety-relevant applications, for example, in a motor vehicle.

In other words, this means that a plastic ball shell fixed in this manner in the joint housing by means of continuous elevations and depressions is often no longer able to meet the currently existing requirements imposed on ball and socket joints in terms of compliance with the intended moments of friction and service life requirements when further stressing effects, for example, intense vibrations, corrosive media and/or abrasives such as dirt or sand particles act on the ball and socket joint during the use of such ball and socket joints.

SUMMARY OF THE INVENTION

Against this background, the object of the present invention is to provide a ball and socket joint which overcomes the drawbacks. The ball and socket joint shall make possible, in particular, good anchoring of the plastic ball shell in the joint housing with better compliance with the intended prestress of the joint or the intended moments of friction between the joint ball and the ball shell as well as with better long-term tightness of the gap between the joint housing and the ball shell.

The ball and socket joint according to the present invention has, in a manner known per se, an essentially annular joint housing, in the essentially cylindrical interior space of which a ball shell can be arranged. The ball of a ball pivot can be accommodated in a slidingly movable manner in the ball shell. Furthermore, the joint housing has elevations and/or depressions arranged in the area of its inner jacket surface, which are used to bring about a positive-locking engagement between the joint housing and the ball shell.

However, the ball and socket joint is characterized according to the present invention in that the inner jacket surface of the joint housing is split into at least two separate functional sections in the axial direction of the joint housing. The inner jacket surface of the joint housing has a smooth cylindrical design in the area of a housing cover-side functional section. Elevations and/or depressions are arranged at the same time only in the area of the ball pivot-side functional section of the inner jacket surface of the joint housing.

In other words, this means that the joint housing is cylindrically smooth in the area of the axial end of its inner jacket surface on the side facing away from the ball pivot and facing the joint housing cover and has no elevations and depressions in this area. Not only is a better and more accurate guiding and positioning of the ball shell in the joint housing achieved as a result during the assembly of the ball and socket joint, but, in particular, a better and more full-surface contact of the housing cover-side collar of the ball shell, which is prepared mostly by ultrasonic beading, is achieved. At the same time, a good positive-locking engagement is ensured, furthermore, between the outer jacket surface of the ball shell and the inner jacket surface of the joint housing due to the elevations and depressions of the inner jacket surface of the joint housing, which are arranged in the farther, ball pivot-side functional area.

The ending of the elevations and depressions of the ball pivot-side functional area into the ball pivot-side front side of the joint housing, which ending continues to be present, is unproblematic concerning the tightness of the gap between the joint housing and the ball shell. This is linked especially with the fact that the ball pivot-side gap between the joint housing and the ball shell is additionally sealed and protected against the entry of moisture and dirt by the joint-side bead of the sealing bellows of the ball and socket joint, which bead is usually arranged there.

The present invention can be embodied regardless of how the elevations and depressions are shaped and arranged in the ball pivot-side functional section as long as the geometry of the elevations and depressions permits a reliable anchoring of the ball shell in the joint housing, which anchoring is, in particular, secured against rotation.

However, according to an especially preferred embodiment of the present invention, the inner jacket surface of the joint housing with the elevations and depressions in the area of the ball pivot-side functional section is prismatic. The axis of the joint housing and the height of the imaginary prism formed by the inner jacket surface of the joint housing in the area of the ball pivot-side functional section coincide or are parallel to one another here.

In other words, this means that the elevations and depressions extend in an axially parallel pattern over the entire length of the ball pivot-side functional section and have an invariable cross section. Undercuts are avoided in this manner in the area of the elevations and depressions, and the joint housing can be easily removed after the manufacture, which is preferably carried out by cold extrusion.

According to other, likewise especially preferred embodiments, the basic shape of the inner jacket surface of the joint housing in the area of the ball pivot-side functional section is essentially cylindrical, and a plurality of edge-like elevations are prepared on the inner jacket surface of the joint housing and a plurality of corresponding depressions are milled in the inner jacket surface of the joint housing.

Edge-like elevations are advantageous because an especially good securing against rotation is achieved in this manner because of the reliable plastic deformation of the outer jacket surface of the ball shell due to the edge-like elevations. By contrast, edge-like depressions lead to an especially small plastic deformation of the ball shell during pressing into the opening of the joint housing. Furthermore, the intended prestressing force of the ball and socket joint is complied with especially accurately in this manner, and an especially reliable, two-dimensional supporting of the ball shell is obtained in case of strong radial forces.

The present invention pertains, furthermore, to a process for manufacturing an essentially annular joint housing for a ball and socket joint by means of extrusion. The joint housing has elevations and/or depressions, which are arranged in the area of its inner jacket surface and which are used for engagement with the surface of a ball shell arranged in the joint housing.

The process is characterized according to the present invention in that the inner jacket surface of the joint housing has a smooth cylindrical design in the area of a housing cover-side functional section, while the elevations and/or depressions are arranged only in the area of a ball pivot-side functional section of the inner jacket surface of the joint housing. In addition, both functional sections are prepared within the framework of a single extrusion operation.

In other words, this means that not only is the basic shape of the joint housing manufactured by an extrusion operation according to the process according to the present invention, but the elevations and depressions are also prepared at the same time on the inner jacket surface of the joint housing in one and the same extrusion operation. The elevations and depressions can thus be manufactured geometrically much more accurately than this is possible according to the state of the art, where the elevations and depressions are prepared by a subsequent embossing or broaching operation in the joint housing manufactured previously, because the dimensional accuracy of the elevations and depressions on the inner jacket surface of the joint housing is determined in the process according to the present invention essentially by the extrusion die only, which can, however, be manufactured with very narrow tolerances.

Furthermore, not only is the basic shape of the joint housing as well as of the ball pivot-side functional section of the joint housing having the elevations and depressions manufactured in the same extrusion operation, but at the same time the smooth cylindrical, housing cover-side functional section as well, which is used to further improve the centering of the ball shell in the joint housing as well as especially to improve the sealing of the gap between the ball shell and the joint housing.

Thus, not only does the smooth cylindrical, housing cover-side functional section of the joint housing lead to a better and more accurate guiding and positioning of the ball shell in the joint housing, but it also permits a better and more full-surface contact of the housing cover-side collar of the ball shell, which is prepared, in general, by ultrasonic beading.

At the same time, the positive-locking engagement between the outer jacket surface of the ball shell and the inner jacket surface of the joint housing is ensured by the elevations and depressions on the inner jacket surface of the joint housing, which are arranged in the ball pivot-side functional section.

The inner jacket surface of the joint housing with the elevations and depressions in the area of the ball pivot-side functional section is essentially prismatic, and the axis of the joint housing and the height of the prism are parallel to one another or coincide.

As a result, undercuts in the die release direction are avoided in the area of the elevations and depressions, and the joint housing can be easily removed from the extrusion die after the manufacture carried out by cold extrusion.

The present invention will be explained in more detail below on the basis of drawings, which show exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
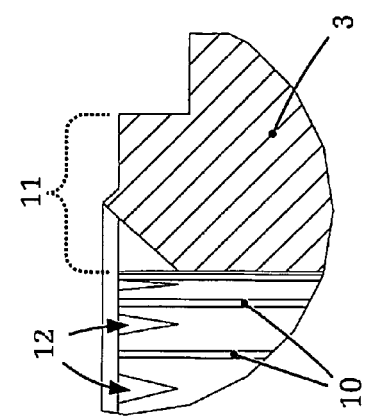
FIG. 1 is a schematic view of a ball and socket joint according to the state of the art in a longitudinal section before the ultrasonic beading.
Figure 3:
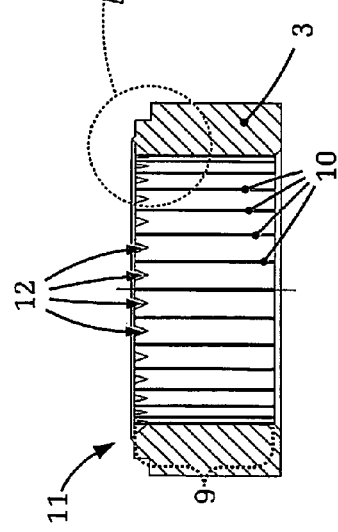
FIG. 3 is the longitudinal section of the joint housing of a ball and socket joint according to the state of the art in a schematic view.
Figure 2:
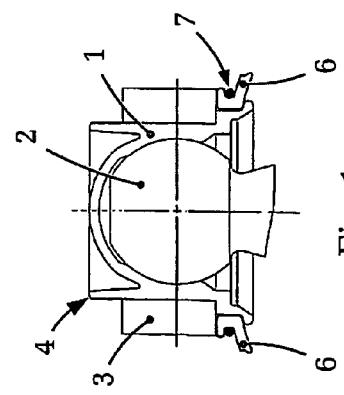
FIG. 2 is the ball and socket joint according to FIG. 1 after the ultrasonic beading in a representation and view corresponding to FIG. 1.
Figure 4:
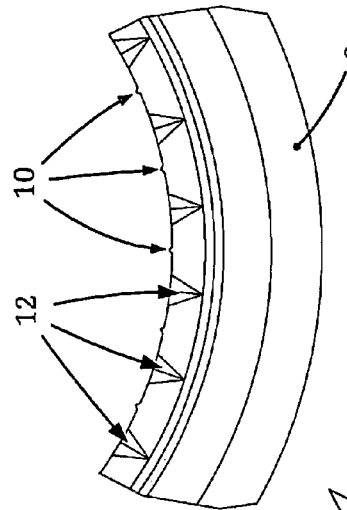
FIG. 4 is an enlarged detail of the joint housing according to FIG. 3 in a representation and view corresponding to FIG. 3.
Figure 5:
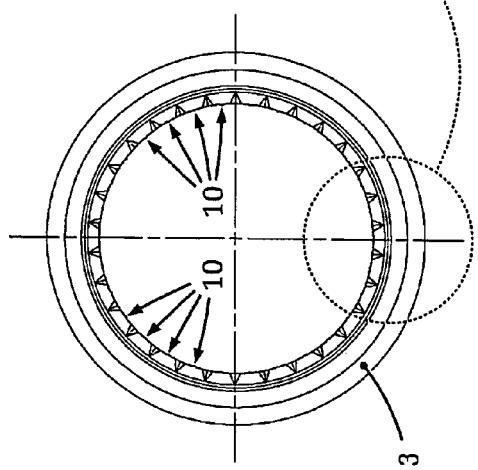
FIG. 5 is the top view of the joint housing according to FIGS. 3 and 4 in a schematic view.
Figure 6:
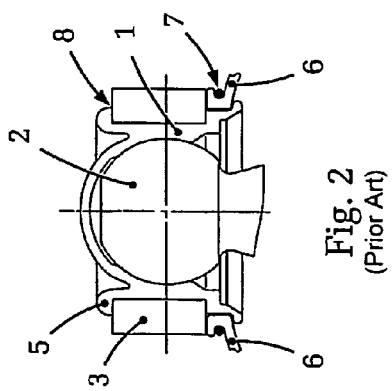
FIG. 6 is an enlarged detail perspective cutaway view of the joint housing according to FIG. 5 in a representation and view corresponding to FIG. 5.
Figure 8:
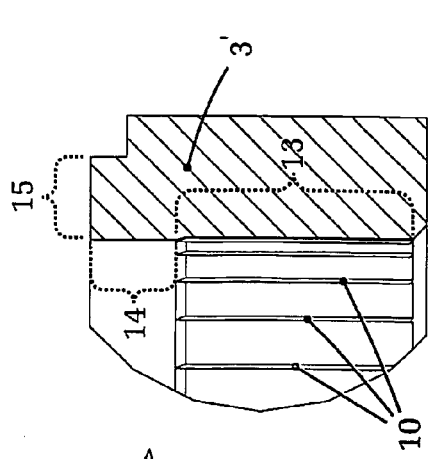
FIG. 8 is a sectional cutaway view showing an enlarged detail of the joint housing according to FIG. 7 in a representation and view similar to FIG. 4.
Figure 10:
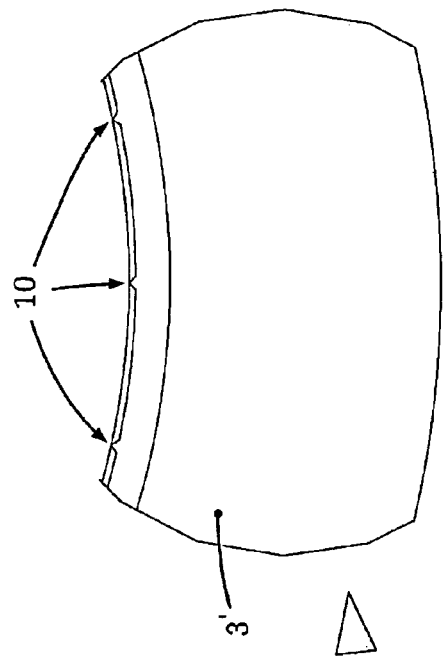
FIG. 10 is perspective cutaway view showing an enlarged detail of the joint housing according to FIG. 9 in a representation and view similar to FIG. 6.

Referring to the drawings in particular, FIGS. 1 and 2 show the housing area of a ball and socket joint according to the state of the art in respective schematic sectional views. In the view in FIG. 1, the ball shell 1 consisting of plastic with the joint ball 2 of the ball pivot, which said joint ball is arranged therein, is still in the original, non-beaded state with the ring collar 4 projecting over the joint housing 3, while the ring collar was beaded into the collar 5 by means of an ultrasound electrode in the view in FIG. 2.

It is recognized that the sealing bellows 6 of the ball and socket joint, which bellows is shown only partially, reinforced by the annular spring 7, seals and protects the ball pivot-side annular gap between the joint housing 3 and the ball shell 1 optimally against entering moisture or dirt. By contrast, the housing cover-side annular gap 8 between the joint housing 3 and the ball shell 1 is exposed largely unprotected to the environmental effects, and foreign substances or dirt may therefore enter in this area in the ball and socket joints of this class according to the state of the art, with the adverse effects concerning the service life of the ball and socket joint, which were described in the introduction.

FIGS. 3 through 6 show the design of the joint housing 3 of the ball and socket joint according to FIGS. 1 and 2, which is known from the state of the art, in an enlarged form illustrated in more detail. It is recognized, in particular, that the inner jacket surface 9 of the joint housing 3 is provided with small, edge-like elevations 10, as a result of which effective securing against rotation is obtained between the joint housing 3 and the ball shell 1 to be pressed into same.

The ball and socket joint being shown, which is known from the state of the art, additionally has, in the area of the housing cover-side front side 11 of the joint housing 3, a number of pyramidal depressions 12, which are distributed regularly along the circumference and which are likewise used to additionally improve securing against rotation between the joint housing 3 and the ball shell 4. However, these two measures, i.e., the edge-like elevations 10 and the pyramidal depressions 12 of the joint housing 3, lead to the problem described in the introduction, according to which tightness is compromised as a result especially in the area of the housing cover-side front surface 11 of the joint housing 3 against the collar 5 of the ball shell 1, which said collar is in contact there at 8, cf. FIG. 2.

This causes foreign substances, water and dirt to find easier access in the area of the housing cover-side gap 8 between the joint housing 3 and the ball shell 1, which may lead, as was described, to premature failure of the ball and socket joint.

Figure 11:
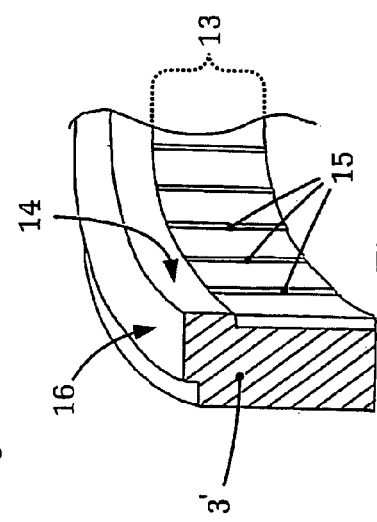
FIG. 11 is a schematic isometric sectional view of a detail of a joint housing according to another embodiment of the present invention.
Figure 7:
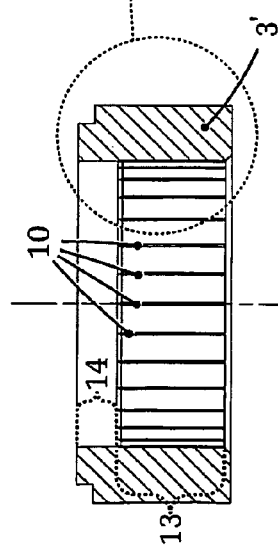
FIG. 7 is a sectional view sowing a joint housing according to an embodiment of the present invention in a representation and view similar to FIG. 3.
Figure 9:
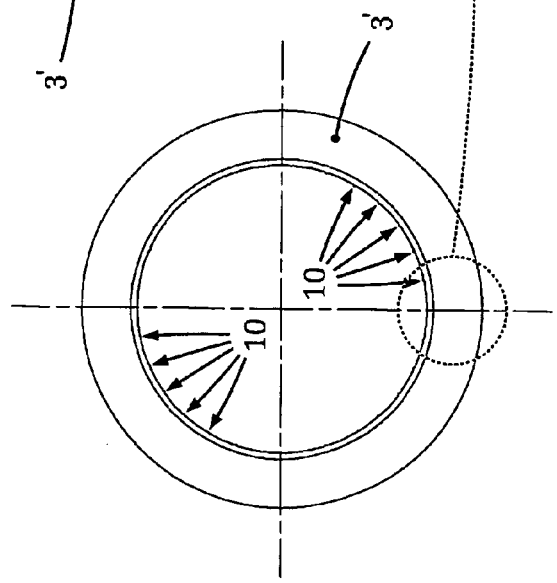
FIG. 9 is the top view of the joint housing according to FIGS. 7 and 8 in a representation and view similar to FIG. 5.

By contrast, the ball and socket joint designed according to the present invention with a joint housing 3' according to FIGS. 7 through 10 or with a joint housing 3" according to FIG. 11 possesses improved properties especially concerning the tightness of the housing cover-side gap 8 between the joint housing 3', 3" and the ball shell 1.

It is recognized that the joint housing 3' according to FIGS. 7 through 10, just like the joint housing 3" according to FIG. 11, has two functional sections 13 and 14, which are different in the axial direction of the joint housing. The generally ball pivot-side functional section 13, which is the lower functional section relative to the drawing, is likewise used here again, due to edge-like elevations 10 (FIGS. 7 through 10) and due to edge-like depressions 15 (FIG. 11), for effective securing against rotation between the joint housing 3', 3" and the ball shell 1 to be pressed into same, which preferably consists of plastic.

However, the joint housings 3', 3" according to FIGS. 7 through 11 additionally have another functional section 14. This functional section 14 of the joint housing 3', 3", which is generally the functional section arranged on the housing cover side and is the upper functional section relative to the drawing, has an essentially smooth cylindrical design and is thus used to accommodate and center the ball shell 1, not shown specifically here, in the joint housing 3', 3" especially accurately. On the other hand, the problem of compromised tightness of the housing cover-side gap 8 between the ball shell 1 and the joint housing 3, which is present in the state of the art, is mitigated or eliminated with the smooth cylindrical functional section 14.

Thanks to the smooth cylindrical functional section 14, the ball shell 1 can now be in contact over its entire circumference with this functional section 14 of the inner jacket surface of the joint housing 3', 3" over its full surface and hence tightly. Furthermore, a smooth, undisturbed and broad front-side contact surface 16 is also obtained for the beaded, housing cover-side ring collar or collar 5, cf. FIG. 2, as a result of which the tightness of the housing cover-side gap 8 between the ball shell 1 and the joint housing 3', 3" can be further improved.

Since both functional sections 13 and 14, i.e., both the ball pivot-side functional surface 13 with the edge-like elevations 10 and depressions 15 and the housing cover-side functional section 14 with the cylindrical inner jacket surface of the joint housing 3, which said inner jacket surface is smooth there, are manufactured according to the present invention in one and the same extrusion die and in one and the same extrusion operation, it is, moreover, always guaranteed that the edge-like elevations 10 and depressions 15 exactly correspond in their dimensions to the specifications and are arranged, moreover, exactly concentrically with the inner jacket surface 13, 14 of the joint housing.

An extremely narrow spread is thus obtained for the prestressing forcing resulting during the pressing in of the ball shell 1 into the joint housing 3', 3" in the ball and socket joint, and it is also possible to set the moments of friction occurring between the joint ball 2 and the ball shell 1 exactly and reproducibly according to the design specifications.

The joint housing 3" according to FIG. 11 differs from the joint housing 3' according to FIGS. 7 through 10 essentially only by the fact that—instead of the edge-like elevations 10 present in the area of the ball pivot-side functional section 13 in the joint housing 3' according to FIGS. 7 through 10—edge-like depressions 15 or impressions 15 are arranged, instead, in the same area 13 in the joint housing 3" according to FIG. 11.

The ball shell 1 can be pressed in this manner into the opening of the joint housing 3', 3" with especially small plastic deformations. Furthermore, the intended prestressing force of the joint housing can be complied with especially accurately in this embodiment, and an especially reliable, two-dimensional support of the ball shell 1 with a very slight notch effect acting on the ball shell 1 is obtained, especially if strong radial forces develop.

It thus becomes clear as a result that the present invention leads to a ball and socket joint and to a process for manufacturing same, from which considerable advantages arise compared to the state of the art because of improved anchoring of the plastic ball shell in the joint housing, while the tightness of the gap between the joint housing and the ball shell is improved at the same time. Improvements are also achieved in terms of the failure safety and service life of the ball and socket joint with the more accurately reproducible tolerances according to the present invention concerning the prestress of the joint and concerning the intended moments of friction between the joint ball and the ball shell. However, the manufacturing costs for the ball and socket joint are not increased at the same time, but there is even a rather substantial potential of reducing the costs because of the integration of previously separate operations.

Thus, the present invention makes an important contribution concerning qualitative and design improvements in ball and socket joints, especially ball and socket joints on the motor vehicle, for example, for rocker pendulums, as well as concerning the resistance of such ball and socket joints to environmental effects. Thanks to the present invention, the increasing requirements imposed by users on ball and socket joints of this class can be met better in this manner, without, however, cost increases being associated herewith in the manufacture and the assembly of the ball and socket joints.

While specific embodiments of the invention have been shown and described in detail to illustrate the application of the principles of the invention, it will be understood that the invention may be embodied otherwise without departing from such principles.

The invention claimed is:

1. A ball and socket joint, for one of a rocker pendulum and an axle system of a motor vehicle, the ball and socket joint comprising:
   an essentially annular joint housing defining an essentially cylindrical interior ball shell space with an inner jacket surface;
   a ball shell; and
   a ball of a ball pivot accommodated in said ball shell in a slidingly movable manner, said ball shell being positioned in said cylindrical interior ball shell space, said joint housing having elevations and/or depressions arranged in an area of said inner jacket surface for engagement with a surface of said ball shell, said inner jacket surface of said joint housing being split, in the axial direction of the joint housing, into at least two separate functional sections wherein said inner jacket surface of said joint housing has a smooth cylindrical surface in the area of a housing cover-side functional section and said elevations and/or said depressions are arranged in the area of a ball pivot-side functional section of said inner jacket surface of said joint housing, wherein said elevations and/or said depressions are not provided in said housing cover-side functional section of said inner jacket surface of said joint housing.

2. A ball and socket joint in accordance with claim 1, wherein a basic shape of said inner jacket surface of said joint housing is essentially cylindrical in the area of said ball pivot-side functional section with a plurality of said elevations forming said inner jacket surface of said joint housing in the area of said ball pivot-side functional section.

3. A ball and socket joint in accordance with claim 1, wherein a basic shape of said inner jacket surface of said joint housing is essentially cylindrical in the area of said ball pivot-side functional section with a plurality of said depressions forming said inner jacket surface of said joint housing in the area of said ball pivot-side functional section.

4. A ball and socket joint in accordance with claim 1, wherein at least a portion of said inner jacket surface in the area of said housing cover-side functional section is arranged adjacent to one end of said elevations and/or said depressions arranged in the area of a ball pivot-side functional section of said inner jacket surface of said joint housing, said elevations and/or said depressions forming a plurality of gaps, wherein said at least said portion of said inner jacket surface in the area of said housing cover-side functional section seals one end of each of said gaps.

5. A ball and socket joint in accordance with claim 4, wherein said elevations and/or said depressions extend from a position at or adjacent to said housing cover-side functional section to a position at or adjacent to one end of said housing, said housing cover-side functional section being located at or adjacent to another end of said housing.

6. A ball and socket joint comprising:
an annular joint housing defining an essentially cylindrical interior ball shell space with an inner jacket surface split, in an axial direction of the joint housing, into a ball pivot-side functional section at a ball pivot exiting side of said annular joint housing and a cover-side functional section adjacent to a cover side of said annular joint housing, said ball pivot-side functional section having at least one of arranged plural elevations and arranged plural depressions in an area of said inner jacket surface for engagement with a surface of said ball shell and said housing cover-side functional section has a smooth cylindrical design, said at least one of said arranged plural elevations and said arranged plural depressions not being formed in said housing cover-side functional section.

7. A ball and socket joint in accordance with claim 6, further comprising:
a ball shell; and
a ball of a ball pivot accommodated in said ball shell in a slidingly movable manner, said ball shell being positioned in said cylindrical interior ball shell space.

8. A ball and socket joint in accordance with claim 7, wherein a basic shape of said inner jacket surface of said joint housing is essentially cylindrical in the area of said ball pivot-side functional section with a plurality of said elevations forming said inner jacket surface of said joint housing in the area of said ball pivot-side functional section.

9. A ball and socket joint in accordance with claim 7, wherein a basic shape of said inner jacket surface of said joint housing is essentially cylindrical in the area of said ball pivot-side functional section with a plurality of said depressions forming said inner jacket surface of said joint housing in the area of said ball pivot-side functional section.

10. A ball and socket joint in accordance with claim 6, wherein said at least one of said arranged plural elevations and said arranged plural depressions define a plurality of gaps, at least a portion of said housing cover-side functional section being located adjacent to at least a portion of said ball pivot-side functional section, wherein one end of each of said gaps is sealed via said at least said portion of said housing cover-side functional section.

11. A ball and socket joint in accordance with claim 10, wherein said at least one of arranged plural elevations and arranged plural depressions extend from a position adjacent to said housing cover-side functional section to a position at or adjacent to one end of said housing, said housing cover-side functional section being located at or adjacent to another end of said housing.

12. A ball and socket joint comprising:
an annular joint housing comprising an inner housing surface, said inner housing surface defining an essentially cylindrical interior ball shell space, said inner housing surface comprising a first inner housing surface portion and a second inner housing surface portion, said first inner housing surface portion defining a ball pivot-side functional section at a ball pivot exiting side of said annular joint housing, said second inner housing surface portion defining an inner border of said housing, said inner border being adjacent to a cover side of said annular joint housing, at least a portion of said inner border extending along a top edge portion of said housing, said first inner housing surface portion being located adjacent to said second inner housing surface portion, said first inner housing surface portion defining at least one of plural elevations and plural depressions in said ball pivot-side functional section for engagement with a surface of said ball shell, said inner border comprising a smooth, cylindrical surface, said inner border sealing one end of said at least one of said plural elevations and said plural depressions.

13. A ball and socket joint in accordance with claim 12, further comprising:
a ball shell; and
a ball of a ball pivot accommodated in said ball shell in a slidingly movable manner, said ball shell being positioned in said cylindrical interior ball shell space.

14. A ball and socket joint in accordance with claim 12, wherein said inner jacket surface of said joint housing, in the area of said ball pivot-side functional section, has an essentially prismatic design, the axis of said joint housing being parallel to a height of a prism.

15. A ball and socket joint in accordance with claim 12, wherein a basic shape of said inner jacket surface of said joint housing is essentially cylindrical in the area of said ball pivot-side functional section with said first housing inner surface portion defining a plurality of said elevations in the area of said ball pivot-side functional section.

16. A ball and socket joint in accordance with claim 12, wherein a basic shape of said inner jacket surface of said joint housing is essentially cylindrical in the area of said ball pivot-side functional section with said first housing inner surface portion defining a plurality of said depressions in the area of said ball pivot-side functional section.

17. A ball and socket joint in accordance with claim 12, wherein said at least one of plural elevations and plural depressions define a plurality of gaps, at least a portion of said inner border being located adjacent to at least a portion of said ball pivot-side functional section, wherein one end of each of said gaps is sealed via at least a portion of said inner border.

18. A ball and socket joint in accordance with claim 17, wherein said at least one of said plural elevations and said plural depressions extend from a position adjacent to said inner border to a position at or adjacent to one end of said housing, said inner border being located at another end of said housing.

* * * * *